US 6,570,931 B1

(12) United States Patent
Song (10) Patent No.: US 6,570,931 B1
(45) Date of Patent: May 27, 2003

(54) SWITCHED VOLTAGE ADAPTIVE SLEW RATE CONTROL AND SPECTRUM SHAPING TRANSMITTER FOR HIGH SPEED DIGITAL TRANSMISSION

(75) Inventor: Hongjiang Song, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,634

(22) Filed: Dec. 31, 1999

(51) Int. Cl.[7] .............................................. H04L 27/04
(52) U.S. Cl. ...................... 375/295; 327/108; 327/261; 327/276
(58) Field of Search ................. 375/244, 254, 375/257, 295, 219, 222; 327/108, 110, 141, 149, 261, 262, 264, 266, 276, 277, 278, 280, 281, 284, 287, 288, 339; 331/57, 8, 177 R, 17; 330/279, 280, 10, 252, 253, 254, 255, 263, 264, 277, 310; 333/25, 141, 144, 152, 164

(56) References Cited

U.S. PATENT DOCUMENTS

| | | | | |
|---|---|---|---|---|
| 4,988,960 A | * | 1/1991 | Tomisawa | 332/127 |
| 5,245,231 A | * | 9/1993 | Kocis et al. | 327/277 |
| 5,272,453 A | * | 12/1993 | Traynor et al. | 331/67 |
| 5,559,476 A | * | 9/1996 | Zhang et al. | 331/57 |
| 5,898,326 A | * | 4/1999 | Okayasu | 327/112 |
| 5,977,819 A | * | 11/1999 | Sanwo et al. | 327/563 |
| 6,166,572 A | * | 12/2000 | Yamaoka | 327/149 |
| 6,490,325 B1 | * | 12/2002 | Fiedler et al. | 375/257 |

* cited by examiner

Primary Examiner—Chi Pham
Assistant Examiner—Khanh Cong Tran
(74) Attorney, Agent, or Firm—Blakely, Sokoloff, Taylor & Zafman LLP (57) ABSTRACT

An apparatus including a switched voltage bit cell (SVBC) array to receive an input voltage signal, each bit cell of the SVBC array configured to add a voltage to the input voltage signal and a delay locked-loop configured to delay an output voltage signal of each bit cell of the SVBC array by a determined step.

21 Claims, 7 Drawing Sheets

SWITCHED VOLTAGE ADAPTIVE SLEW RATE CONTROL AND SPECTRUM SHAPING TRANSMITTER FOR HIGH SPEED DIGITAL TRANSMISSION

FIELD OF THE INVENTION

The invention relates to switched voltage adaptive slew rate control and a spectrum shaping transmitter for, among other possible uses, high speed digital transmission.

BACKGROUND

Figure 1:
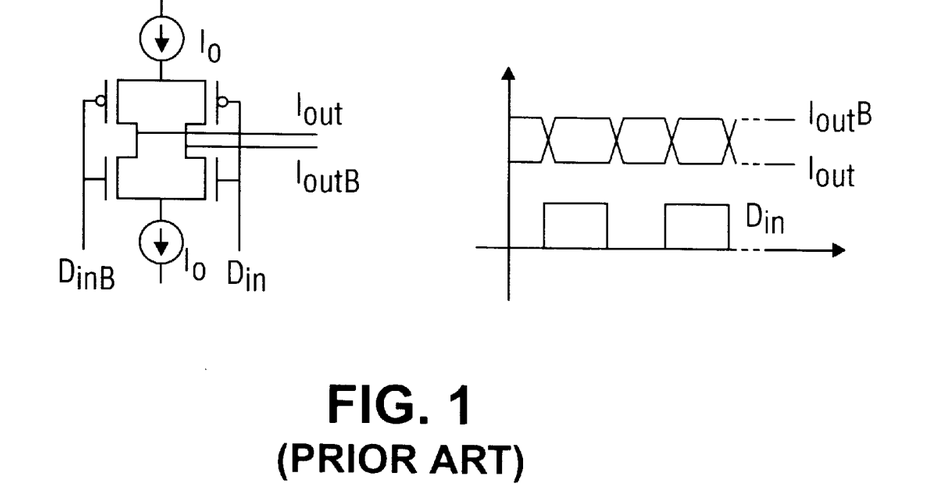
FIG. 1 is a schematic diagram of a current mode transmitter with high noise immunity and lower switching noise, used for the high-speed digital data transmission.
Figure 2:
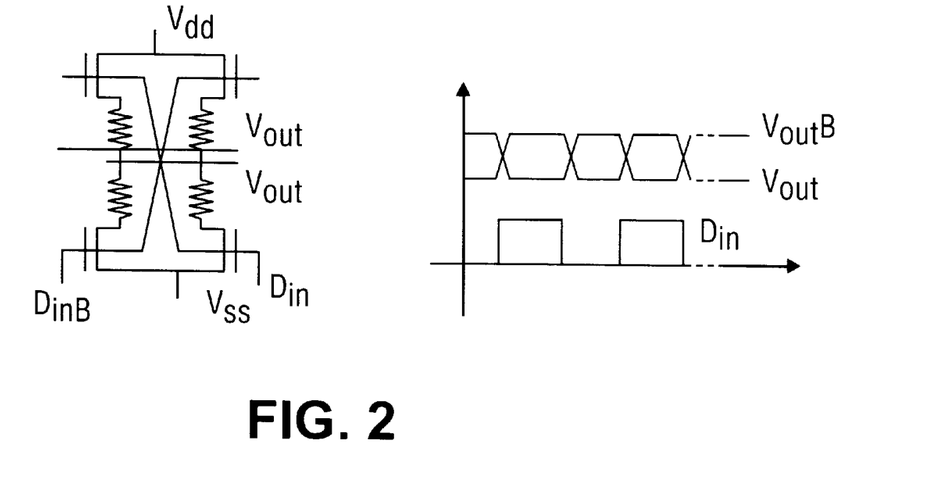
FIG. 2 is a schematic diagram of a voltage mode transmitter, used to lower the operation voltage limit.

Current mode transmitters, as shown in FIG. 1, with high noise immunity and lower switching noise, are widely used for high-speed digital data transmission. However, current mode transmitters usually require stack or saturation transistors for high accuracy current generation, which imposes a limit on the lowest applicable operation voltage of the transmitter. Alternatively, a voltage mode transmitter, as shown in FIG. 2, may be used to lower this operation voltage limit.

There are several design concerns associated with most voltage mode transmitters. First, transmitter power supply design specifications will be tighter, because unlike the current mode transmitter, the voltage mode transmitter itself does not provide the voltage or current regulating capability. Therefore, power supply noise coupling to the signal may be significant which may degrade the transmitted signal performance.

Figure 3:
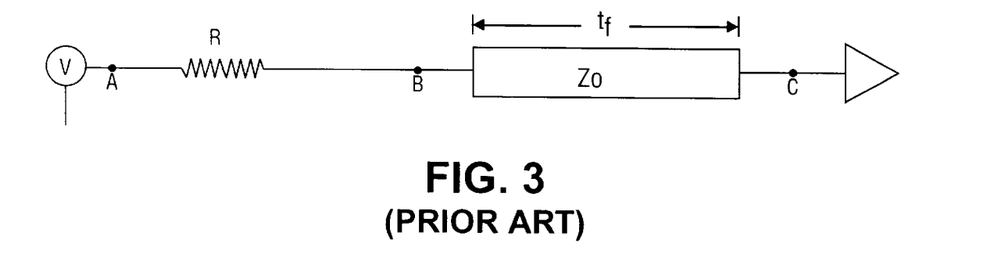
FIG. 3 illustrates the problem of signal reflections when a terminating impedance is not equal to the impedance of the transmission line.

Second, the transmitter output impedance uncertainty during switching may cause significant impedance mismatch and result in unexpected reflections. As line speeds and lengths increase, the problem of signal reflections becomes important. It should be noted that there will be no reflection at the termination only when the terminating impedance (R as represented in FIG. 3) is equal to the characteristic impedance (Zo as represented in FIG. 3) of the line. Thus, a terminating impedance different from Zo will give rise to a reflected wave which travels away from the termination. The reflection, upon reaching the other end, will itself be reflected if the terminating impedance at that end is different from Zo.

Figure 4:
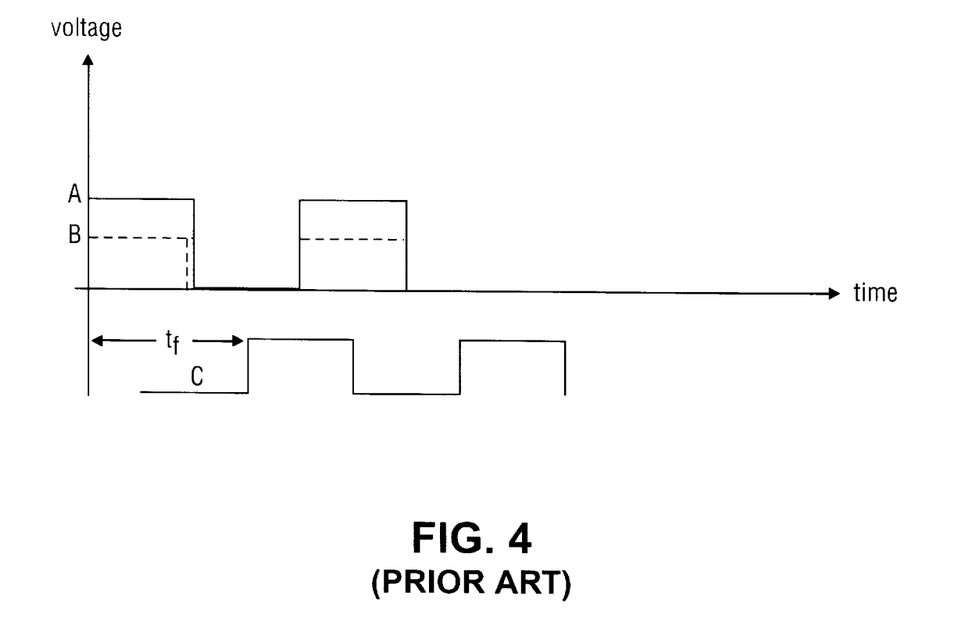
FIG. 4 illustrates the case where a signal is delayed because of capacitors and connectors in the line which are responsible for refraction and noise.

Third, the high sensitivity of output signal slew rate to the device parasitic, power supply, temperature, and process variations may make the electromagnetic interference (EMI), reflection, and other undesired effects by slew rate control ineffective. As shown in FIG. 4, the signal at point C is delayed because of capacitors and connectors in the line which are responsible for refraction and noise. High speed digital data transmission systems usually suffer from reflections generated by discontinuities on the signal path at the package, connectors, board, and cable interfaces. These reflections can significantly affect the input/output timing margins and degrade system performance. Fly time (tf), for example, which represents the delay of signal C with respect to signal A, is generally due to cable propagation delay.

Fourth, large switch transistors switching DC paths may generate high power supply switching noises (di/dt, IR, etc.).

In addition to impedance matching, the minimization of these reflections usually requires the slew rate of the transmitted data signal to be well controlled. But a problem arises with wide process, voltage, and temperature variations. It is observed that an optimal slew rate at one process corner can result in four or five times difference from the optimal value at a different corner. The excessively slow or fast slew rate in turn results in large data jitter and degrades system performance. Therefore in high speed data transmission, an effective slew rate control scheme is very important.

Traditionally, external resistors and capacitors were used in order to match impedance and control the slew rate. Because adjusting resistors and capacitors is extremely difficult and also not cost-effective, a new technique is needed.

SUMMARY

In accordance with the invention, there is disclosed an apparatus including a switched voltage bit cell (SVBC) array to receive an input voltage signal, each bit cell of the SVBC array configured to add a voltage to the input voltage signal and a delay locked-loop configured to delay an output voltage signal of each bit cell of the SVBC array by a determined step.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 5:
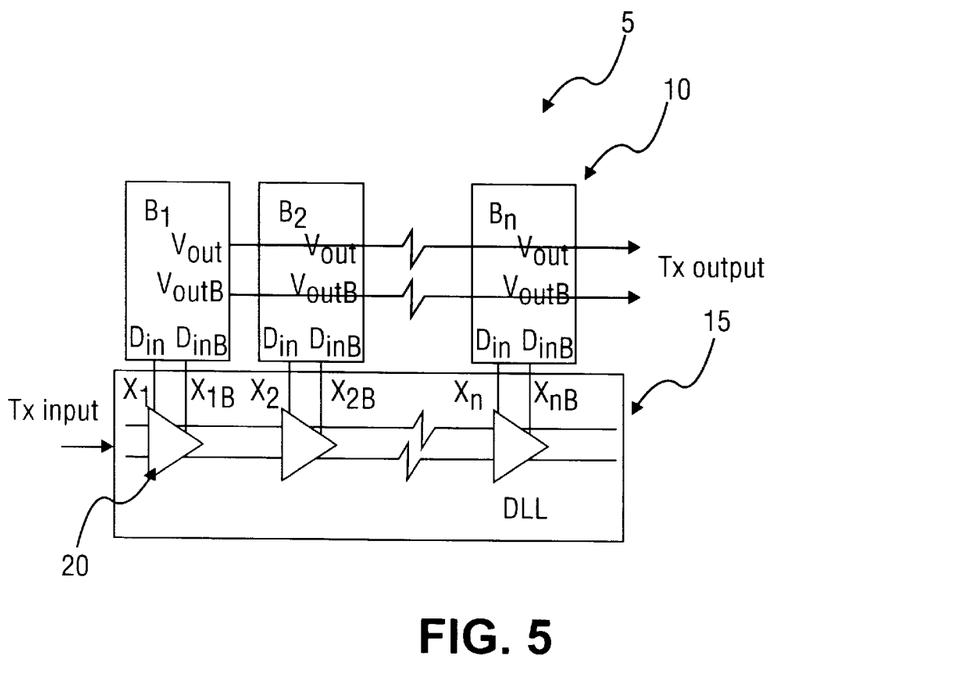
FIG. 5 is a schematic diagram of a switched voltage transmitter for adaptive slew rate control and spectrum shaping for high speed digital transmission, in accordance with an embodiment of the invention.
Figure 10:
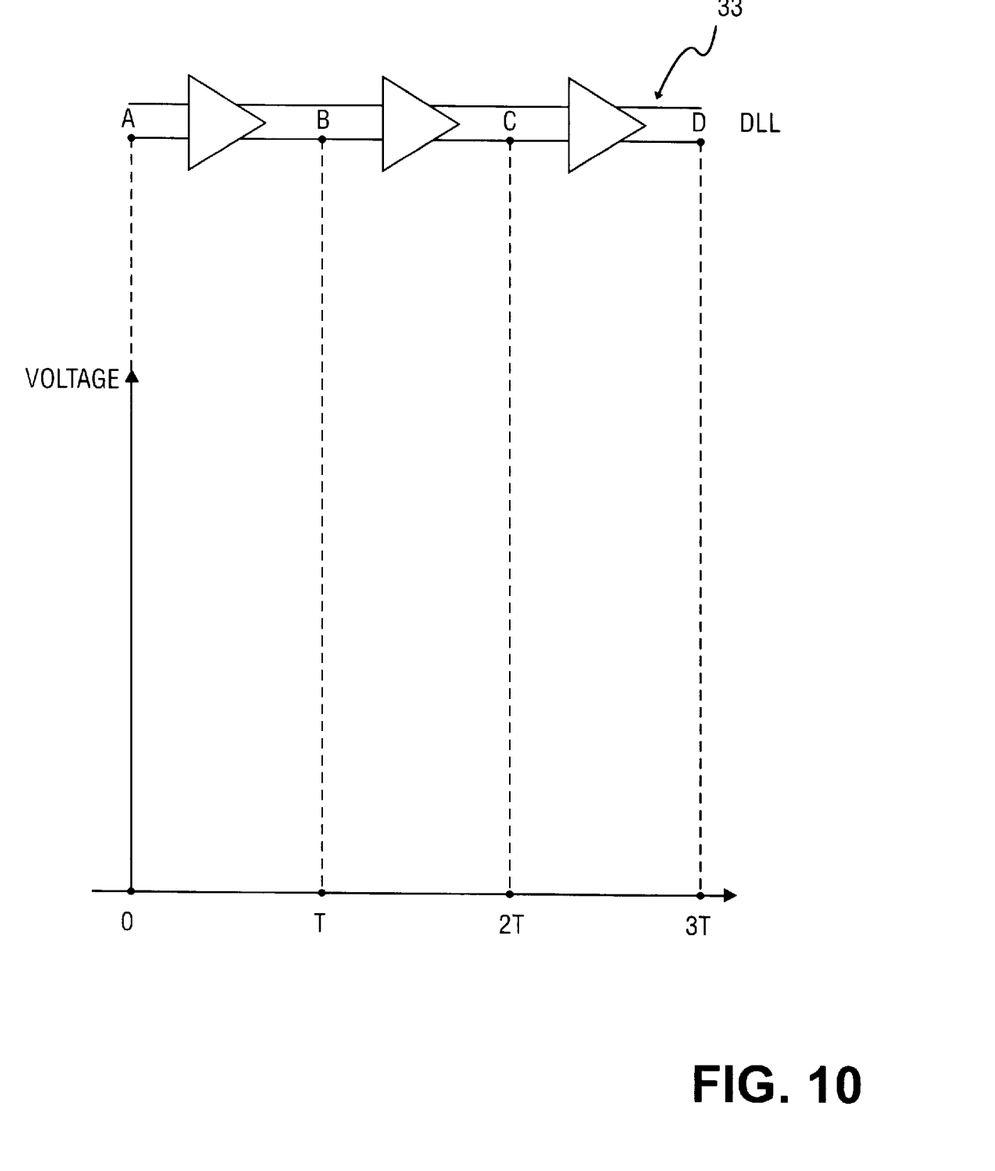
FIG. 10 illustrates a timing diagram of a digital delay locked-loop (DLL) at different positions on the delay line, in accordance with an embodiment of the invention.

A method and apparatus pertaining to a switched voltage adaptive slew rate control and spectrum shaping transmitter for high speed digital transmission is described. In one aspect, the architecture, as shown in FIG. 5, includes switched voltage transmitter 5 developed to address the concerns of the prior art. This transmitter is based on an over-sampling finite impulse response (FIR) digital filter principle, consisting of a set of connected parallel differential switched voltage bit cells (SVBC) 10 and digital delay locked-loop (DLL) 15. The delay line is locked to the transmission clock using DLL 30 to accurately control the ramp time of the output, as shown in FIG. 10. By use of a digital delay locked-loop (DLL), the slew rate of the transmitter output may be controlled, independent of device sizing, temperature, process variations and individual switched voltage bit cell (SVBC) switching slew rate. In addition, the sequential switching of the SVBC substantially minimizes switching noises.

Figure 6:
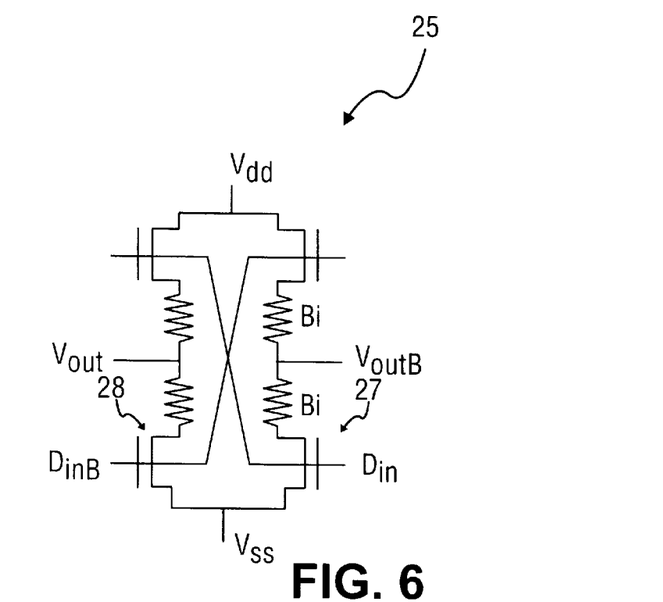
FIG. 6 is a schematic diagram of a switched voltage bit cell (SVBC) having a similar circuit structure as a voltage mode transmitter, in accordance with an embodiment of the invention.

In FIG. 5, DLL 15 provides switch timing for each individual SVBC 10, SVBC 10 having the same circuit structure as voltage mode transmitter 25, as shown in FIG. 6. Each individual SVBC 10 of the array is configured in parallel with the adjoining bit cell by shorting the output voltages between the two cells. In a steady state condition, each voltage mode transmitter 25 in FIG. 6 has well defined output conductance. Each voltage mode transmitter is also differential without any dc path therefore resulting in substantial reduction of any switching noises. Still further, each voltage mode transmitter 25 is complimentary. When data input signal (Din) is high, data input signal B (DinB) is necessary low. In one embodiment, if Din is high, then switch 27 will be closed, therefore an output (VoutB) will be obtained. In addition, Vout will be 0 as DinB is low and switch 28 is open. Therefore, depending on the signal Din or DinB that is input, the output voltage will be switched to the particular value.

DLL 15 includes, in one embodiment, a plurality of digital controllable delay buffer cells 20. Each digital controllable delay buffer cell 20 in DLL 15 can be represented by the circuit in FIG. 8. After each buffer cell 20 shown in FIG. 5, the transmission signal is delayed by one step.

Figure 7:
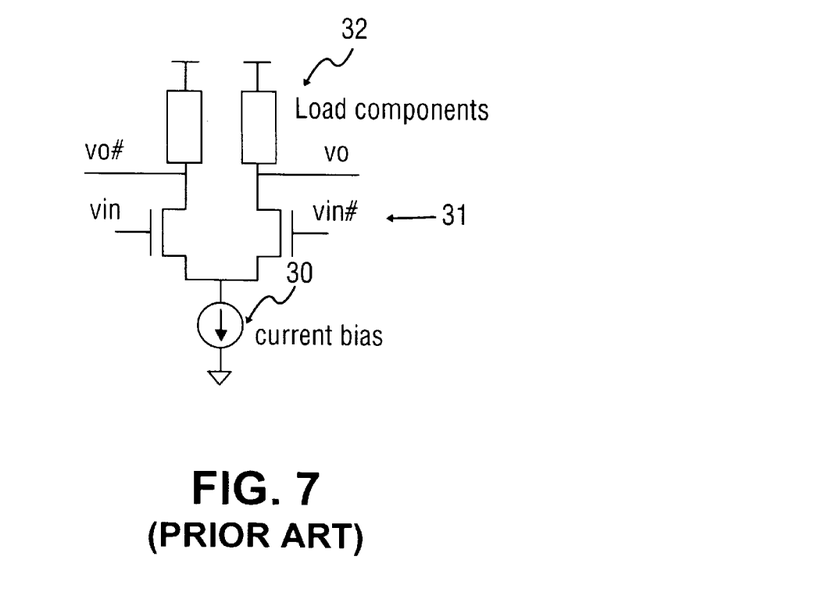
FIG. 7 is a schematic diagram of a single-stage differential circuit structure, consisting of a current bias, an input component pair, and a load component pair, in accordance with an embodiment of the invention.

In recent years, there have been significant efforts in the development of mixed-signal circuits, primarily driven by the benefits of cost reduction and performance enhancement through analog and digital circuit integration onto a single chip. Differential circuits, which generally have better signal integrity with larger noise margin and lower noise generation, are widely used in analog and signal-integrity-critical digital circuit implementations of the mixed signal chips. Shown in FIG. 7 is a single-stage differential circuit structure, consisting of current bias 30, input component pair 31, and load component pair 32. However, these types of circuits require very careful selection of all device and circuit parameters (sizing, biasing, signal swings, gain, speed, drive capability, etc). Even worse, significant tuning or even re-design are usually required for different applications or using different manufacture process technologies due to the highly process dependent nature of the device parameters. Consequently, development of highly reusable differential analog and digital circuits will be very important for the success of the future low cost mixed signal VLSI chips.

Figure 8:
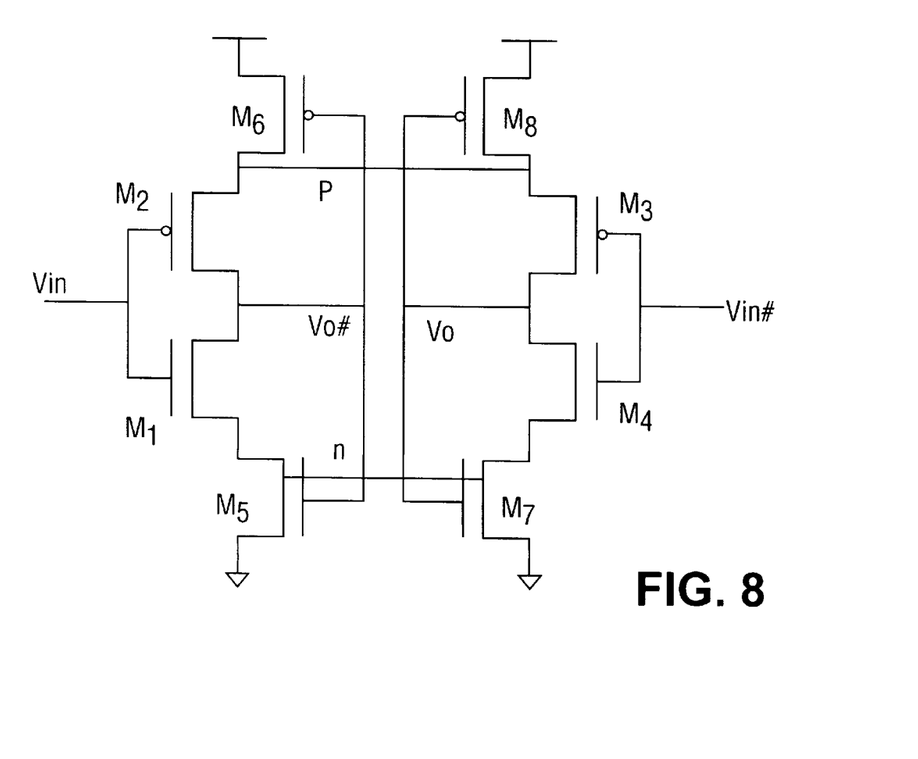
FIG. 8 is a schematic diagram of a symmetric differential complimentary metal-oxide semiconductor (SDCMOS) structure with improved circuit reusability, in accordance with an embodiment of the invention.

A symmetric differential complimentary metal-oxide semiconductor (SDCMOS) structure with improved circuit reusability is presented in this invention. As shown in FIG. 8, in one embodiment, the basic SDCMOS circuit uses two CMOS transistor pairs (M1, M2, M3, M4) as the input devices, which extend the input signal to full swing. Additional two CMOS transistor pairs (M5, M6, M7, M8), are used for current biases and loads. The gates of the bias/load branches are shorted together at points p and n. As can be seen, the entire circuit is symmetric at both left-to-right and top-to-bottom directions. There are three feedback loops in this circuit structure, including the left loop by transistor M1, M2, M5, and M6, the right loop by transistor M3, M4, M7, and M8 and a common mode loop by all transistors as represented by p and n in FIG. 8. For example, a signal at $V_{in}$ will generate a current $I_1$, through transistor M6. Likewise, a signal at $V_{in}\#$ will generate a current $I_2$ through transistor M8. Both currents will join at common mode p to form current $I_c$, where $I_c=I_1+I_2$. In the same manner, a signal at $V_{in}$ will also generate a current $I_3$ through transistor M5, and a signal at $V_{in}\#$ will generate a current $I_4$ through transistor M7. Both currents will join at common modes n to form current $I_c$ where $I_c32 I_3+I_4$. The circuit configuration illustrated is dynamically self-biased. It can provide higher bias current around the cross-point to achieve zero dc-bias, high speed, and a "soft landing" (avoiding noise and glitches in the signal). These properties make SDCMOS circuits very robust in various applications situations (large power supply range, rail-to-rail signal swings, large transistor size range etc), and very scalable on different manufacture process technologies.

Figure 9:
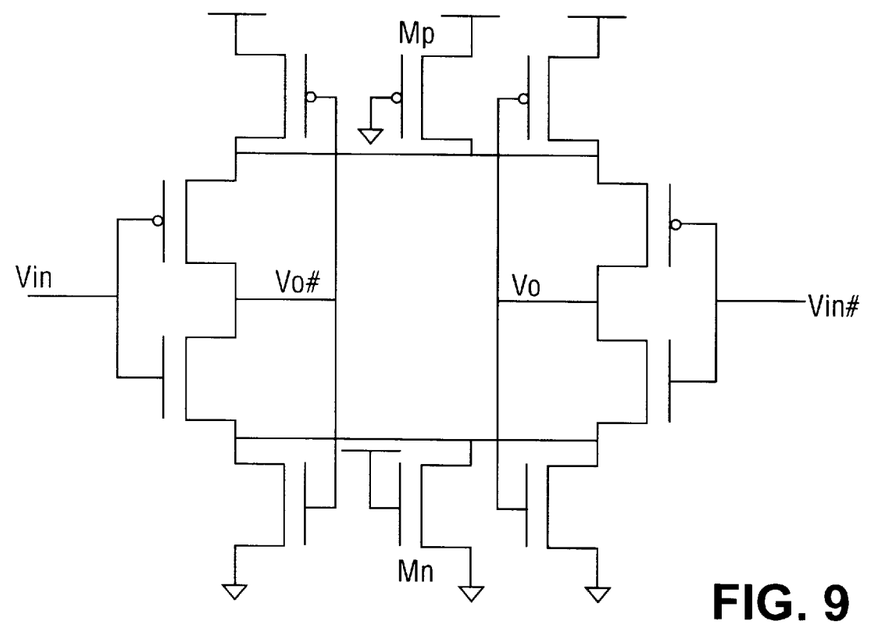
FIG. 9 is a schematic diagram of a high speed CMOS differential buffer for either input, intermediate, or output stages, in accordance with an embodiment of the invention.

In a differential circuit, such as the SDCMOS, the output of the inverters M5, M6, M7, and M8 are used to self-bias the circuit. This allows the circuit to be more stable since no additional external circuitry is needed to self-contain the circuit. The SDCMOS structure illustrated in FIG. 8 can be used for various mixed-signal applications. Shown in FIG. 9 is a high speed CMOS differential buffer for either input, intermediate, or output stages. Two leakage transistors, Mp and Mn, are used in this circuit to eliminate the dc-path in the down stream circuit by pulling up or down the outputs to rail during the power down mode. In one chip configuration, the dc-path elimination technique significantly reduced the static current of the circuit. For a large size down-stream circuit of the same type, such as the interconnect driver/repeater of the clock or critical signals used in one application, this technique can provide significant power reduction.

The slew rate measures the maximum rate-of-change of voltage across the output terminals and is normally expressed in volts per second. One purpose of controlling the slew rate is to ensure a constant rising and falling time, and that the rising and falling edges of the signal pulse are symmetric. The excessively slow or fast slew rate in turn results in large data jitter and degrades system performance. Therefore in high speed data transmission, an effective slew rate control scheme is very important.

The overall transmitter slew rate is almost independent of the slew rate of each SVBC, which allows to use faster SVBC switching to minimize the switching output impedance uncertainty of each SVBC. Use of DLL 15 for accurate SVBC switch timing makes the slew rate of the transmitter output accurately controlled, independent of device sizing, temperature, process variations and individual SVBC switching slew rate. The sequential switching of the SVBC minimizes the switching noises. (di/dt, IR, etc.) by approximately a factor of N, where N is the number of SVBC circuits used in sequential switching, where the averaging effect improves the impedance uncertainty by approximately a factor of N. That is, the transmission line is terminated in an impedance Zo approximately equal to a factor of Rs/N (Rs being the resistance of each SVBC)) if the conductance of each SVBC is equal and a factor of $$\frac{1}{\frac{1}{r_1}+\frac{1}{r_2}+\cdots\frac{1}{r_N}}$$

if the conductance of each SVBC is different.

FIG. 10 illustrates a timing diagram of DLL 33 at different positions on the delay line. The output ramp voltage (Vo) is controlled by the switched voltage values of the bit cells. For example, where voltage signal A is the input signal, the sum of the voltage signals A and B is the value obtained after the first digital controllable delay buffer 20 in DLL 15 has provided switch timing for the first SVBC 25. If the initial clock period is $\alpha*T$, then the final clock period will be $\alpha/N*T$, where N is the number of SVBC 25. As the number of SVBC 25 units increases, the slope of the output ramp voltage (Vo) varies, resulting in a slower or faster slew rate. If the conductance of each SVBC is the same, then all voltage steps will be equal. In one embodiment, DLL 33 makes the transmitter output slew rate adaptively tracking the transmission data speed, independent of the process, temperature, and supply voltage variations, thus providing an effective method to control or adjust the slew rate to a desired value.

Figure 11:
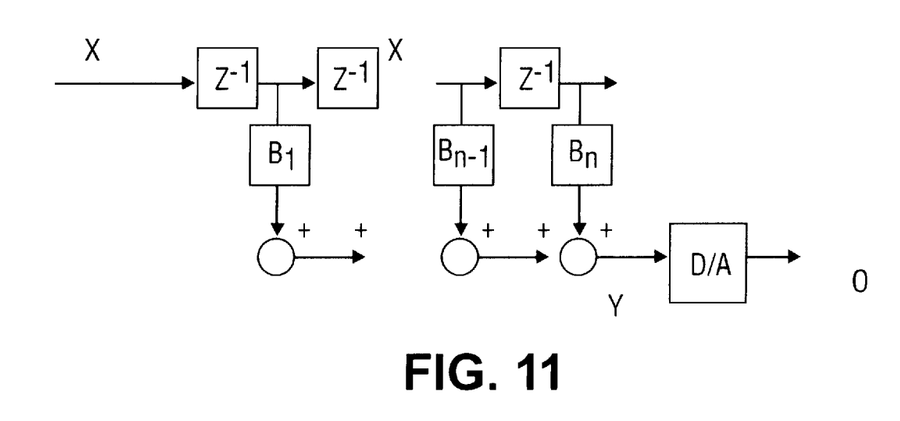
FIG. 11 is a schematic diagram of a high speed oversampling finite impulse response (FIR) filter structure, in accordance with an embodiment of the invention.

Besides the performance improvement discussed above, such as impedance matching and slew rate control, this proposed architecture also offers features such as transmission signal spectrum shaping with the use of a built-in high speed over-sampling finite impulse response (FIR) filter structure as shown in FIG. 11. This FIR filter can be expressed by the z-domain transfer function as:

$$Y/X=a_1z^{-1}+a_2z^{-2}+\ldots+a_nz^{-n}.$$

Spectrum shaping operation of the transmitted signal can be realized by programming (hardwired or real time programming) the FIR filter by adjusting filter coefficients $\{a_0,a_1,a_2 \ldots a_n\}$, which in turn vary filter conductance ($g_i$) of each cell of the SVBC. Thus, this filter is used when different values of $g_i$ are anticipated for the SVBC units. This frequency domain design capability allows the transmitter to be modeled, designed, and tested using all related well-developed DSP techniques. The DLL structure enables the transmitter FIR digital filter to operate at a speed close to the maximum allowed for a given process technology. This ultra-high processing speed is critical for digital data transmission at 1 Gbt/s level and beyond. This spectrum shaping capability can be used to attenuate or enhance certain frequency components of the transmitted data signal in various applications, such as channel equalization, reflection reduction, EMI minimization, etc, which are very critical for high speed data transmission.

Figure 12:
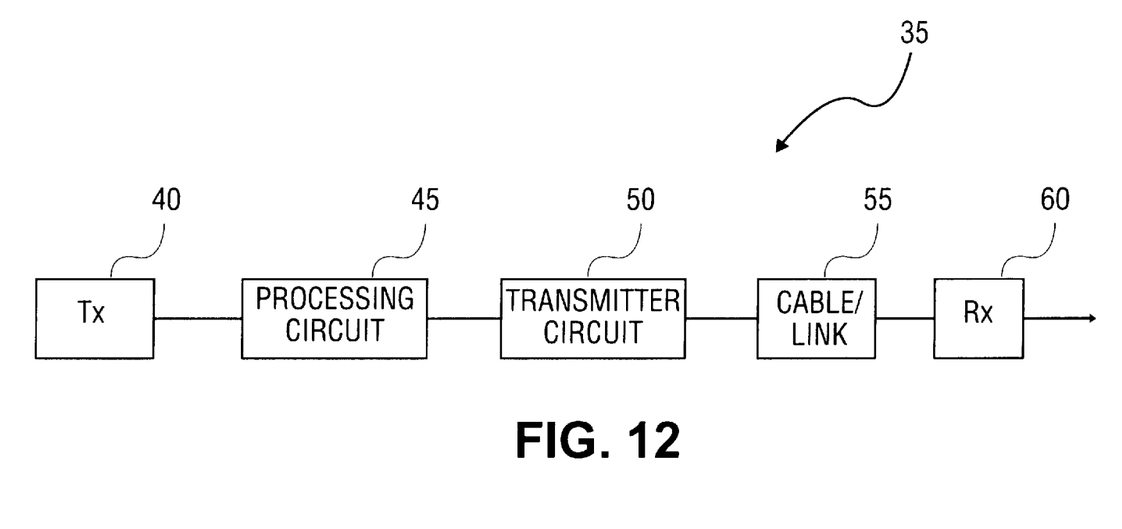
FIG. 12 is a general block diagram of a system incorporating a transmitter circuit according to one embodiment of the invention comprising a first communication terminal, a processing circuit, a transmitter circuit, a communication link, and a second communication link.

FIG. 12 is a general block diagram that illustrates a communication system 35 for providing information carried by digital baseband data. In FIG. 12, processing circuit 45 is connected to receive a digital baseband data signal from first communication terminal 40 and for converting the received digital baseband data into an analog voiceband signal and providing it for transmission. Transmitter circuit 50, such as the transmitter circuit described above with reference to FIG. 5 and the accompanying text, is connected to receive an analog voiceband signal from processing circuit 45 and to provide an analog voiceband signal for transmission. Communication link 55 is coupled to transmitter circuit 50. Finally, second communication terminal 60 receives the analog voiceband signal from transmitter circuit 50 via communication link 55 where the output of second communication terminal 60 is digital baseband data.

Implementation of the transmitter circuit of the invention greatly benefits from its DSP algorithm based operation and the digital DLL based adaptive slew control scheme. First, the DSP-based design makes the transmitter architecturally very scalable because of its algorithm-based operation, the adaptive switch timing control, fully digital process compatible implementation, and the digital circuit-like scaling behaviors. Second, this architecture can be realized using transistor-only circuits for full digital process compatibility, and allows this transmitter to be directly integrated to the digital chip without requiring any modification to either the circuit or the process technology. Such a method has shown to be very cost-effective. Third, the use of DLL to compensate for the process, temperature, and supply voltage variations makes the implementation also very scalable across different process technologies. Fourth, the regular bit-slice structure in the architecture reduces the cells needed to be designed, therefore significantly improving design productivity.

Physically, this transmitter implementation can be very small because neither resistor nor capacitor are required for the design. In addition, the FIR filter is implemented in a very power-effective way, which allows the transmitter to be operated at very high speed with low power.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
   a switched voltage bit cell (SVBC) array to receive an input voltage signal, each bit cell of the SVBC array configured to add a voltage to the input voltage signal; and
   a delay locked-loop (DLL) configured to delay an output voltage signal of each bit cell of the SVBC array by a determined step.

2. The apparatus of claim 1, wherein each bit cell of the SVBC array comprises a voltage mode transmitter.

3. The apparatus of claim 2, wherein each bit cell of the SVBC array is a differential circuit comprising an output voltage without any direct-current (dc) path.

4. The apparatus of claim 2, wherein each cell of the SVBC array is configured in parallel with an adjoining bit cell by shorting the output voltages between the two bit cells.

5. The apparatus of claim 2, wherein each bit cell of the SVBC array has a conductance, the sum of which corresponds to an impedance of a receiver adapted to receive the output voltage signal.

6. The apparatus of claim 1, wherein the DLL comprises a plurality of digital controllable differential delay buffers.

7. The apparatus of claim 4, wherein each switched voltage bit cell generates a single step delay.

8. The apparatus of claim 6, wherein the digital controllable differential delay buffer comprises a symmetric differential complimentary metal-oxide semiconductor (SDCMOS) circuit.

9. The apparatus of 8, wherein the SDCMOS circuit comprises two complimentary metal-oxide semiconductor transistor pairs as input devices, and two other complimentary metal-oxide semiconductor load transistor pairs which are shorted together.

10. The apparatus of claim 9, wherein respective gates of the load transistor pairs are connected to differential outputs.

11. The apparatus of claim 1, further comprising a finite impulse response (FIR) filter structure adapted to obtain different values for an individual conductance ($g_i$) of each switched voltage bit cell of the array.

12. The apparatus of claim 11, wherein the FIR filter structure is expressed by a z-domain transfer function as: $Y/X = a_1 z^{-1} + a_2 z^{-2} + \ldots a_n z^{-n}$.

13. The apparatus of claim 11, wherein the FIR filter structure adjusts filter coefficients $\{a_0, a_1, a_2 \ldots a_n\}$, which in turn vary conductance ($g_i$) of each switched voltage bit cell of the array adapted to provide spectrum shaping.

14. A method comprising:
sequential switching by an array of switched voltage bit cells (SVBC) to add voltages; and
delaying an input voltage signal to provide switch timing for each cell of the array.

15. The method of claim 14, wherein sequential switching by each switched voltage bit cell of the SVBC array comprises switching by a voltage mode transmitter.

16. The method of claim 15, wherein sequential switching of the output voltage by each switched voltage bit cell of the array comprises minimizing switching noises by approximately a factor of N, where N is the number of switched voltage bit cells used in sequential switching.

17. The method of claim 14, further comprising oversampling with a finite impulse response (FIR) filter structure to obtain values for an individual conductance ($g_i$) of each switched voltage bit cell of the array.

18. The method of claim 17, wherein filtering comprises conditioning a signal by a z-domain transfer function as: $Y/X = a_1 z^{-1} + a_2 z^{-2} + \ldots a_n z^{-n}$.

19. The method of claim 17, further comprising spectrum shaping of a transmitted signal including programming the FIR filter structure by adjusting filter coefficients $\{a_0, a_1, a_2 \ldots a_n\}$.

20. A communication system comprising:
a first communication terminal coupled to provide information carried by digital baseband data;
a processing circuit connected to receive a digital baseband data from the first communication terminal and capable of converting the received digital baseband data into an analog voiceband signal and providing it for transmission;
a transmitter circuit connected to receive an analog voiceband signal from the processing circuit and to provide an analog voiceband signal capable of transmission, said transmitter circuit comprising:
a switched voltage bit cell (SVBC) array to receive an input voltage signal, each bit cell of the array configured to add a voltage to the input voltage signal; and
a delay locked-loop (DLL) configured to delay an output voltage signal of each bit cell of the SVBC array by a determined step;
a communication link coupled to the transmitter circuit; and
a second communication terminal coupled to provide the analog voiceband signal from the transmitter circuit via said communication link, wherein the output of the second communication terminal is digital baseband data.

21. The communication system of claim 20, wherein each bit cell of the SVBC array comprises a switched voltage bit cell (SVBC) having a circuit structure of a voltage mode transmitter.

* * * * *